US010924468B2

(12) United States Patent
Suresh et al.

(10) Patent No.: US 10,924,468 B2
(45) Date of Patent: Feb. 16, 2021

(54) REMOTE DESKTOP PROTOCOL PROXY WITH SINGLE SIGN-ON AND ENFORCEMENT SUPPORT

(71) Applicant: Citrix Systems, Inc., Fort Lauderdale, FL (US)

(72) Inventors: Viswanath Yarangatta Suresh, Bengaluru (IN); Arkesh Kumar, San Jose, CA (US); Dileep Reddem, San Jose, CA (US); Anil Kumar Gavini, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 194 days.

(21) Appl. No.: 16/047,109

(22) Filed: Jul. 27, 2018

(65) Prior Publication Data
US 2020/0036699 A1 Jan. 30, 2020

(51) Int. Cl.
*H04L 29/06* (2006.01)
*H04L 29/08* (2006.01)

(52) U.S. Cl.
CPC ........ *H04L 63/0815* (2013.01); *H04L 63/083* (2013.01)

(58) Field of Classification Search
CPC .............. H04L 63/0815; H04L 63/083; H04L 63/0884; H04L 67/38; H04L 67/08; H04L 63/105; H04L 63/0823; G06F 9/452
See application file for complete search history.

(56) References Cited

U.S. PATENT DOCUMENTS

| 8,473,749 | B1* | 6/2013 | Madsen | H04L 67/34 713/187 |
| 9,288,281 | B2* | 3/2016 | Solter | H04L 63/0892 |
| 2009/0106349 | A1* | 4/2009 | Harris | H04L 67/02 709/203 |
| 2009/0119504 | A1* | 5/2009 | van Os | H04L 9/3271 713/153 |
| 2009/0193126 | A1* | 7/2009 | Agarwal | H04L 63/0272 709/228 |
| 2009/0193513 | A1* | 7/2009 | Agarwal | H04L 63/166 726/15 |

(Continued)

OTHER PUBLICATIONS

International Search Report and Written Opinion for International Appl. No. PCT/US2019/041826, dated Sep. 13, 2019.

*Primary Examiner* — Darren B Schwartz
(74) *Attorney, Agent, or Firm* — Foley & Lardner LLP

(57) ABSTRACT

Described embodiments provide systems and methods for launching a connection to a resource link from a client device. A device can authenticate the client device for access to a plurality of resource links accessible via one or more servers. The device can provide a list of the plurality of resource links responsive to the authentication, and receive a request from the client device, identifying a first resource link to access. The device can cause first authenticated credentials for the first resource link to be stored on the client device responsive to the request. The first authenticated credentials can correspond to the client device and provide access the first resource link. The client device can be configured to launch a connection to the first resource link from the client device using the first authenticated credentials stored on the client device.

20 Claims, 10 Drawing Sheets

(56) References Cited

U.S. PATENT DOCUMENTS

| | | | |
|---|---|---|---|
| 2010/0242092 A1* | 9/2010 | Harris | H04L 63/08 |
| | | | 726/3 |
| 2011/0154464 A1 | 6/2011 | Agarwal et al. | |
| 2014/0082715 A1* | 3/2014 | Grajek | G06F 16/955 |
| | | | 726/8 |
| 2015/0381593 A1* | 12/2015 | Low | H04L 63/168 |
| | | | 726/5 |
| 2016/0094539 A1* | 3/2016 | Suresh | H04L 63/0272 |
| | | | 726/7 |
| 2016/0099917 A1* | 4/2016 | Glazemakers | H04L 69/30 |
| | | | 726/12 |
| 2016/0134588 A1* | 5/2016 | Falkowitz | H04L 63/1441 |
| | | | 726/11 |
| 2016/0277400 A1* | 9/2016 | Maurya | H04L 63/0807 |
| 2016/0381080 A1 | 12/2016 | Reddem et al. | |
| 2018/0295134 A1* | 10/2018 | Gupta | H04L 67/28 |

\* cited by examiner

REMOTE DESKTOP PROTOCOL PROXY WITH SINGLE SIGN-ON AND ENFORCEMENT SUPPORT

BACKGROUND

In computer networks, a proxy server can be disposed between a client machine and a target site. The proxy server can provide a connection from the client machine to the target site. To connect to the target server, a user of the client machine typically enters login credentials. If the client machine attempts to connect to a different target site, the user of the client machine typically needs to enter login credentials a second time. Thus, the user of the client machine can be requested to enter their login credentials each time they access a different site or application.

SUMMARY

This Summary is provided to introduce a selection of concepts in a simplified form that are further described below in the Detailed Description. This Summary is not intended to identify key features or essential features, nor is it intended to limit the scope of the claims included herewith.

Systems and methods for remote desktop protocol (RDP) proxy with single sign-on and enforcement support are provided herein. An appliance is disposed within a network environment between one or more clients and one or more resource servers, such as but not limited to RDP host servers. The appliance can generate authentication credentials that enable the client device to access one or more resource links independent of the appliance. For example, the appliance can store the authentication credentials on the client device or otherwise provide the credentials to the client device such that the client device can launch a connection to a resource link using the authentication credentials. The launch initiated at the client device using the authentication credentials can support enforcement of various connection protocols (e.g., smart access) for access to at least one RDP host server through the respective resource link.

When a client device authenticates to the appliance, the appliance can provide the client device a list of resource links (e.g., RDP resource links) that a user of the client device can access using authentication credentials. The resource links can be generated such that when the client device interacts with the respective resource link (e.g., link is clicked), the request for a connection (e.g., RDP connection) is received by the appliance. As the appliance has already authenticated the client device, the appliance knows the authentication credentials to be used for the requested connection. The appliance can provide the authentication credentials to the requested connection to the client device. For example, in some embodiments, the appliance can store the authentication credentials on the client device through use of a script, command line, and/or a downloadable file.

With the authentication credentials stored on the client device, the connection can be launched without a prompt for credentials. For example, the connection can be launched directly to the corresponding RDP host server of the connection can be launched through the appliance with or without enforcement support.

The authentication credentials can be provided to the client device using a variety of different techniques. For example, in some embodiments, the appliance can provide the authentication credentials to the client device through use of a script, such as embedded within the resource links. When a user of the client device interacts with the script, the authentication credentials can be downloaded to the client device.

The appliance can be configured to authenticate a client device based in part on username data and/or load balance data corresponding to one or more connections to one or more resource servers. The appliance can retrieve information corresponding to a first resource server and the authentication credentials for a client device requesting access to the first resource server using the username data and/or the load balance data. The appliance can authenticate to the first resource server and provide enforcement support based on the authentication credentials of the client device and proxy a client side and server side connection between the client device and the first resource server.

In some embodiments, the appliance can be configured to authenticate a client device based in part on a modified username stored on the client device through script and obtained within a connection to at least one of the resource links. For example, the appliance can identify a resource server and retrieve authentication credentials for a client device requesting access to the resource server using the modified username stored on the client device through a script and obtained within an RDP stream for an RDP connection to the particular resource server.

A first aspect provides a method for launching a connection to a resource link from a client device. The method include authenticating, by a device intermediary to a client device and one or more servers, the client device for access to a plurality of resource links accessible via the one or more servers. The method further includes providing, by the device to the client device, a list of the plurality of resource links responsive to the authentication, and receiving, by the device, a request from the client device, identifying a first resource link from the plurality of resource links. The device can cause the first authenticated credentials for the first resource link to be stored on the client device responsive to the request. The first authenticated credentials can correspond to the client device to access the first resource link. The client device can be configured to launch a connection to the first resource link from the client device using the first authenticated credentials stored on the client device.

Another aspect provides a system for launching a connection to a resource link from a client device. The system includes a device intermediary to a client device and a server. The device can be configured to authenticate the client device for access to a plurality of resource links accessible via the one or more servers, provide to the client device a list of the plurality of resource links responsive to the authentication, receive a request from the client device identifying a first resource link from the plurality of resource links, and cause first authenticated credentials for the first resource link to be stored on the client device responsive to the request. The first authenticated credentials can correspond to the client device to access the first resource link. The client device can be configured to launch a connection to the first resource link from the client device using the first authenticated credentials stored on the client device.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements.

Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for remote display protocol proxy with single sign-on and enforcement support.

A. Network and Computing Environment

Figure 1A:
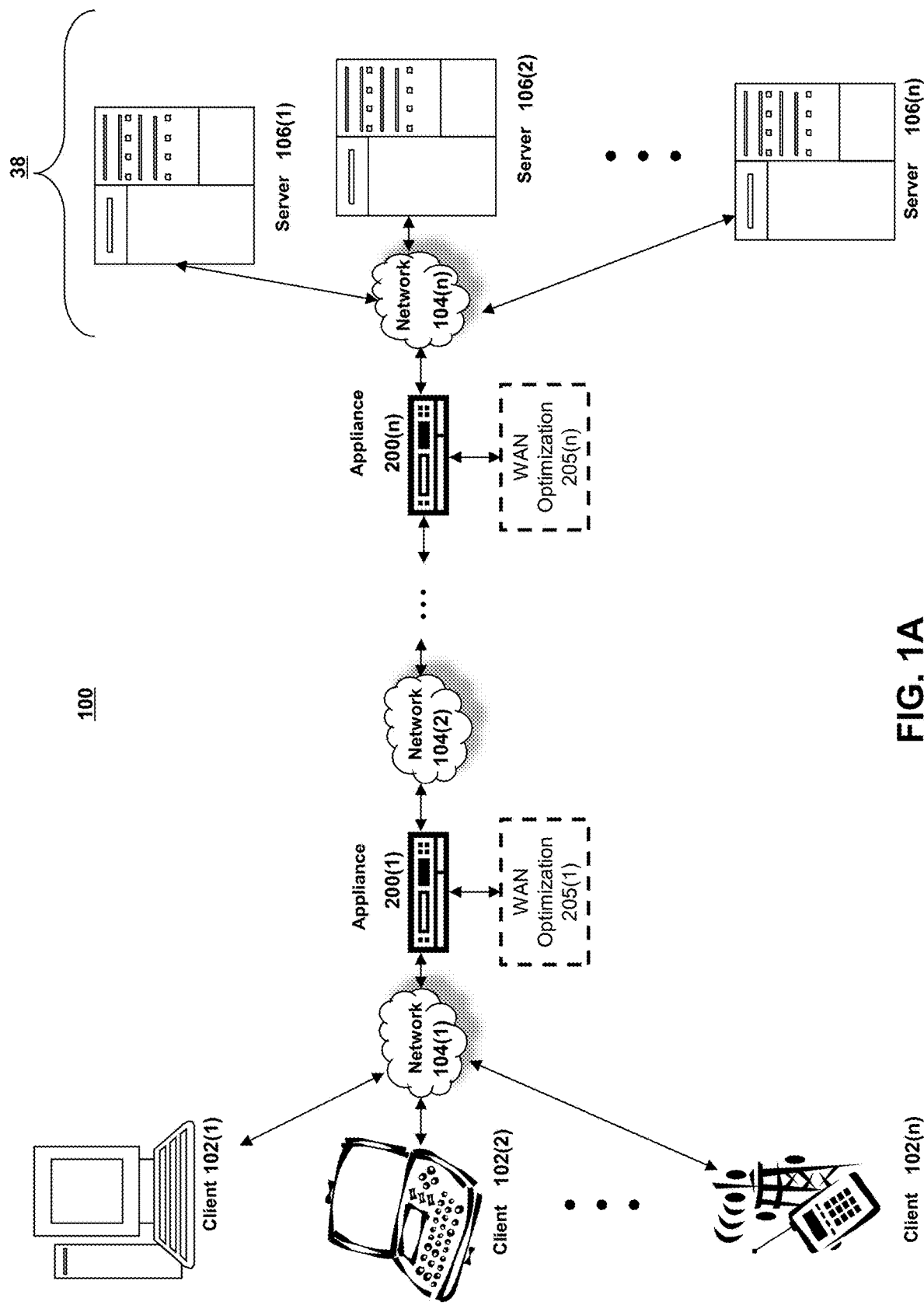
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Cloud-Bridge® products sold by Citrix Systems, Inc. of Fort Lauderdale, Fla.

Figure 1B:
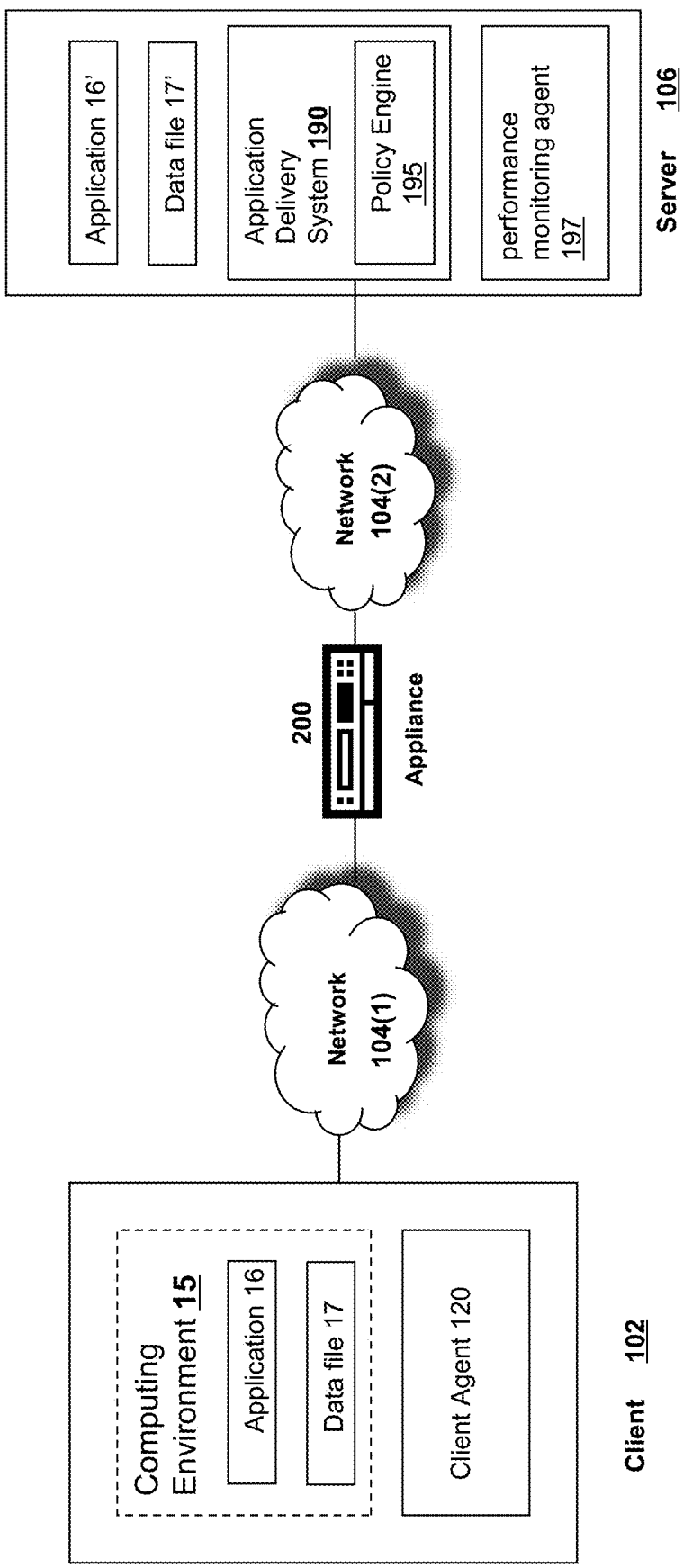
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 50 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 50), servers 106 (e.g., agent 197) or an appliances 200 and/or 205 (agent not shown). In general, monitoring agents (e.g., 50 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
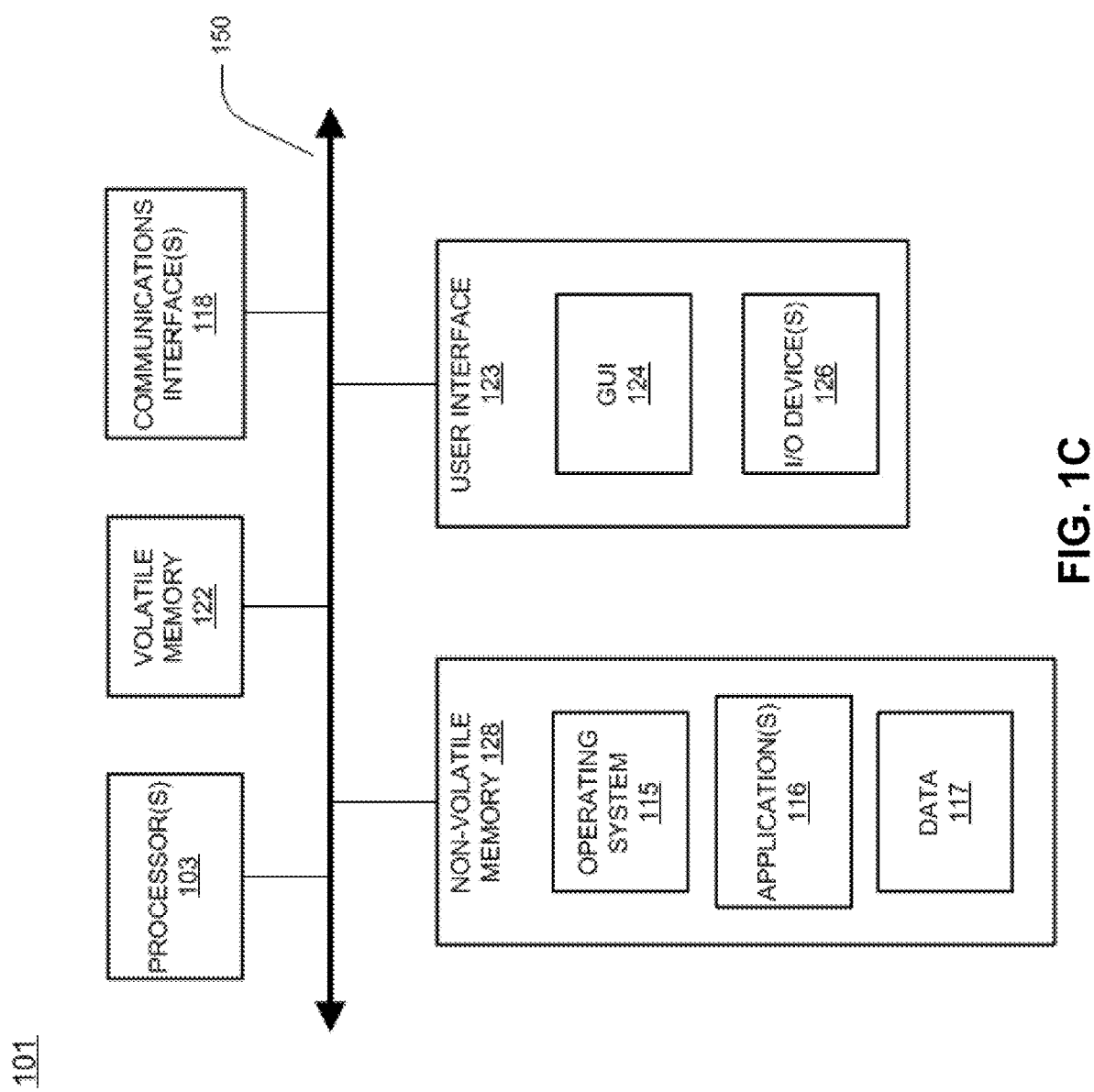
FIG. 1C is a block diagram of a computing device, in accordance with an illustrative embodiment.

As shown in FIG. 1C, computer 101 may include one or more processors 103, volatile memory 52 (e.g., RAM), non-volatile memory 58 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 53, one or more communications interfaces 118, and communication bus 150. User interface 53 may include graphical user interface (GUI) 54 (e.g., a touchscreen, a display, etc.) and one or more input/output (I/O) devices 56 (e.g., a mouse, a keyboard, etc.). Non-volatile memory 58 stores operating system 115, one or more applications 116, and data 117 such that, for example, computer instructions of operating system 115 and/or applications 116 are executed by processor(s) 103 out of volatile memory 52. Data may be entered using an input device of GUI 54 or received from I/O device(s) 56. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

Figure 2:
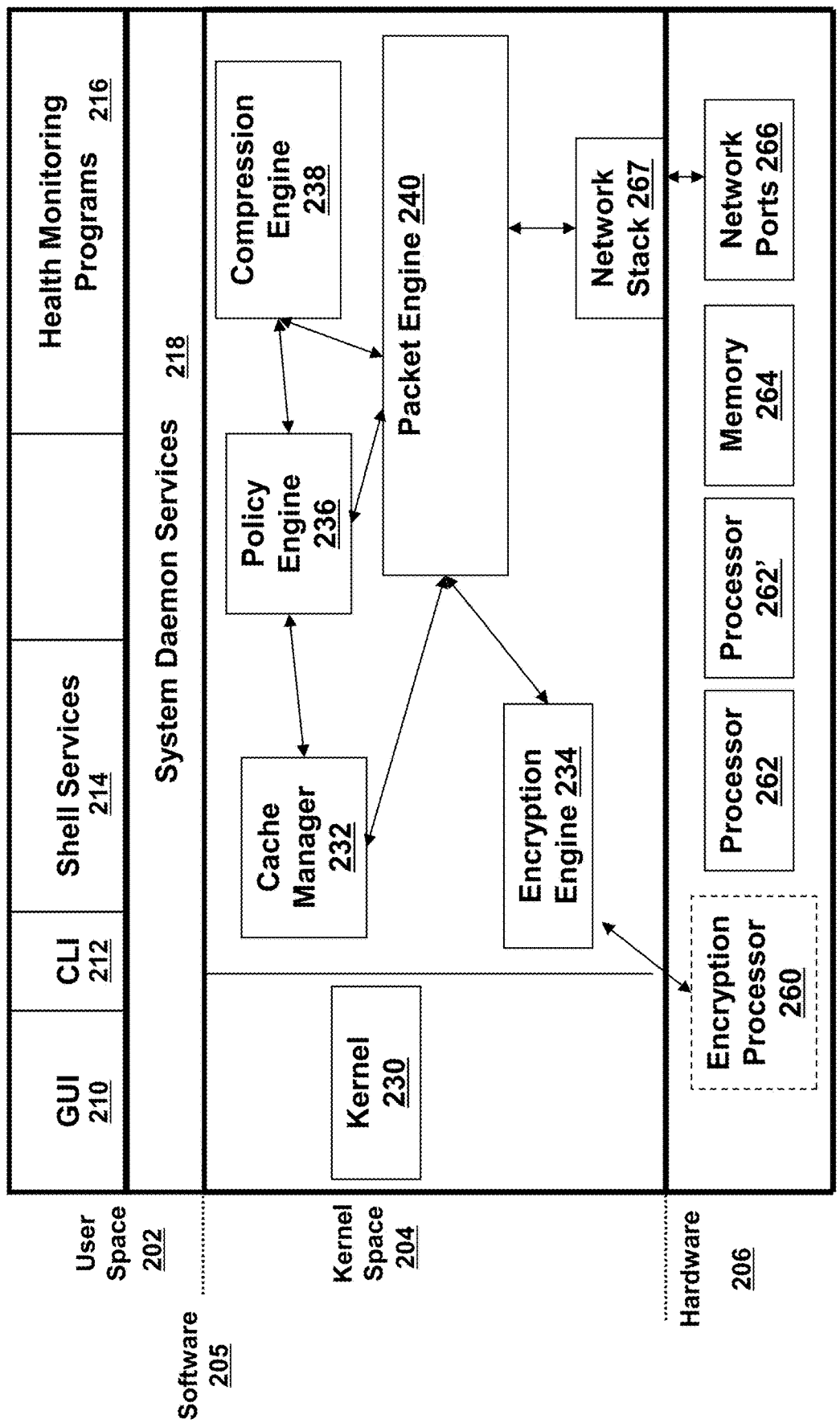
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 50 for establishing and exchanging communications with appliance 200 and/or server 106 via a network 104. Client 102 may have installed and/or execute one or more applications that are in communication with network 104. Client agent 50 may intercept network communications from a network stack used by the one or more applications. For example, client agent 50 may intercept a network communication at any point in a network stack and redirect the network communication to a destination desired, managed or controlled by client agent 50, for example to intercept and redirect a transport layer connection to an IP address and port controlled or managed by client agent 50. Thus, client agent 50 may transparently intercept any protocol layer below the transport layer, such as the network layer, and any protocol layer above the transport layer, such as the session, presentation or application layers. Client agent 50 can interface with the transport layer to secure, optimize, accelerate, route or load-balance any communications provided via any protocol carried by the transport layer.

In some embodiments, client agent 50 is implemented as an Independent Computing Architecture (ICA) client developed by Citrix Systems, Inc. of Fort Lauderdale, Fla. Client agent 50 may perform acceleration, streaming, monitoring, and/or other operations. For example, client agent 50 may accelerate streaming an application from a server 106 to a client 102. Client agent 50 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 50 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538, 345, issued Jan. 3, 2017 to Citrix Systems, Inc. of Fort Lauderdale, Fla., the teachings of which are hereby incorporated herein by reference.

Figure 3:
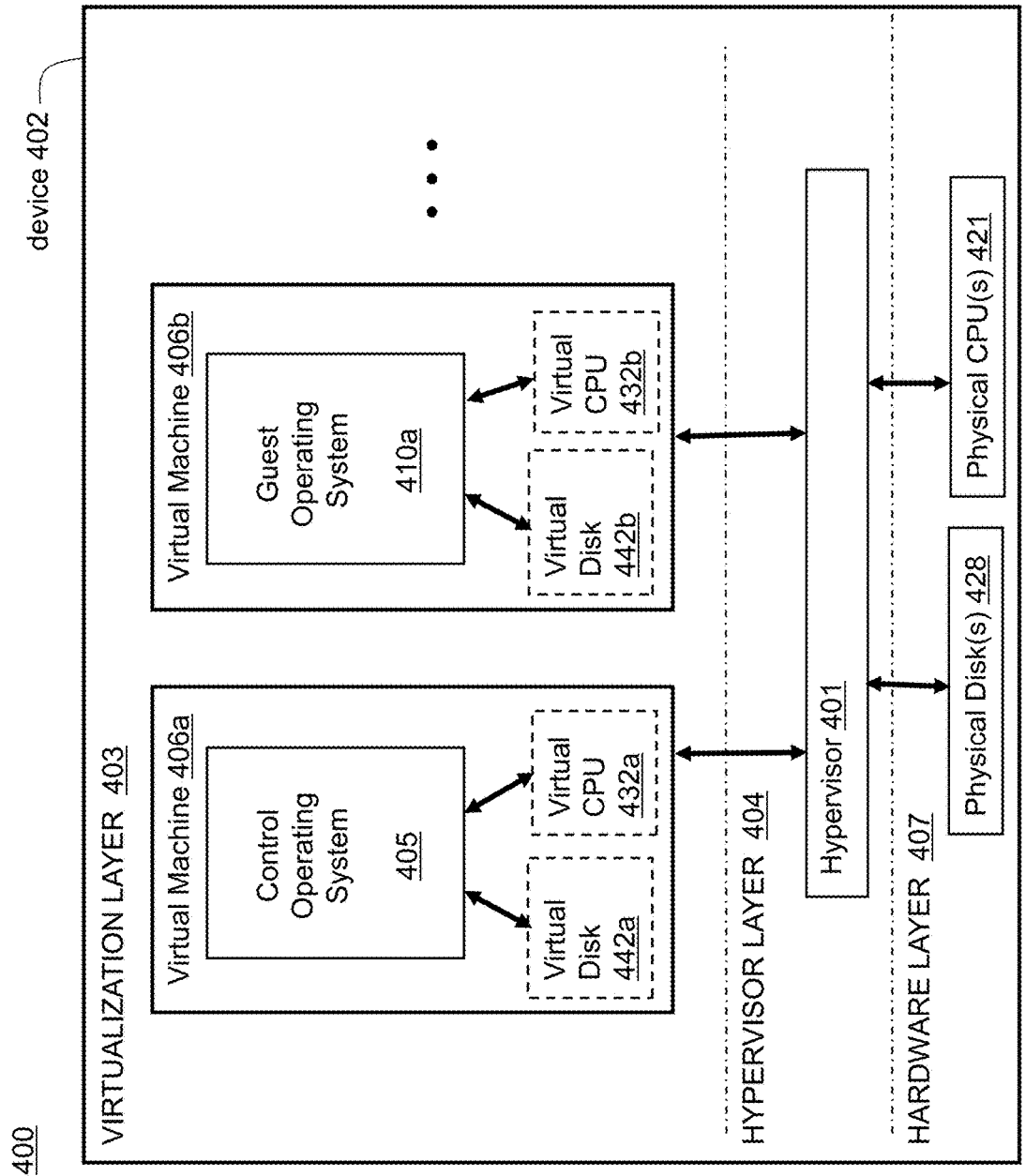
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

Figure 4:
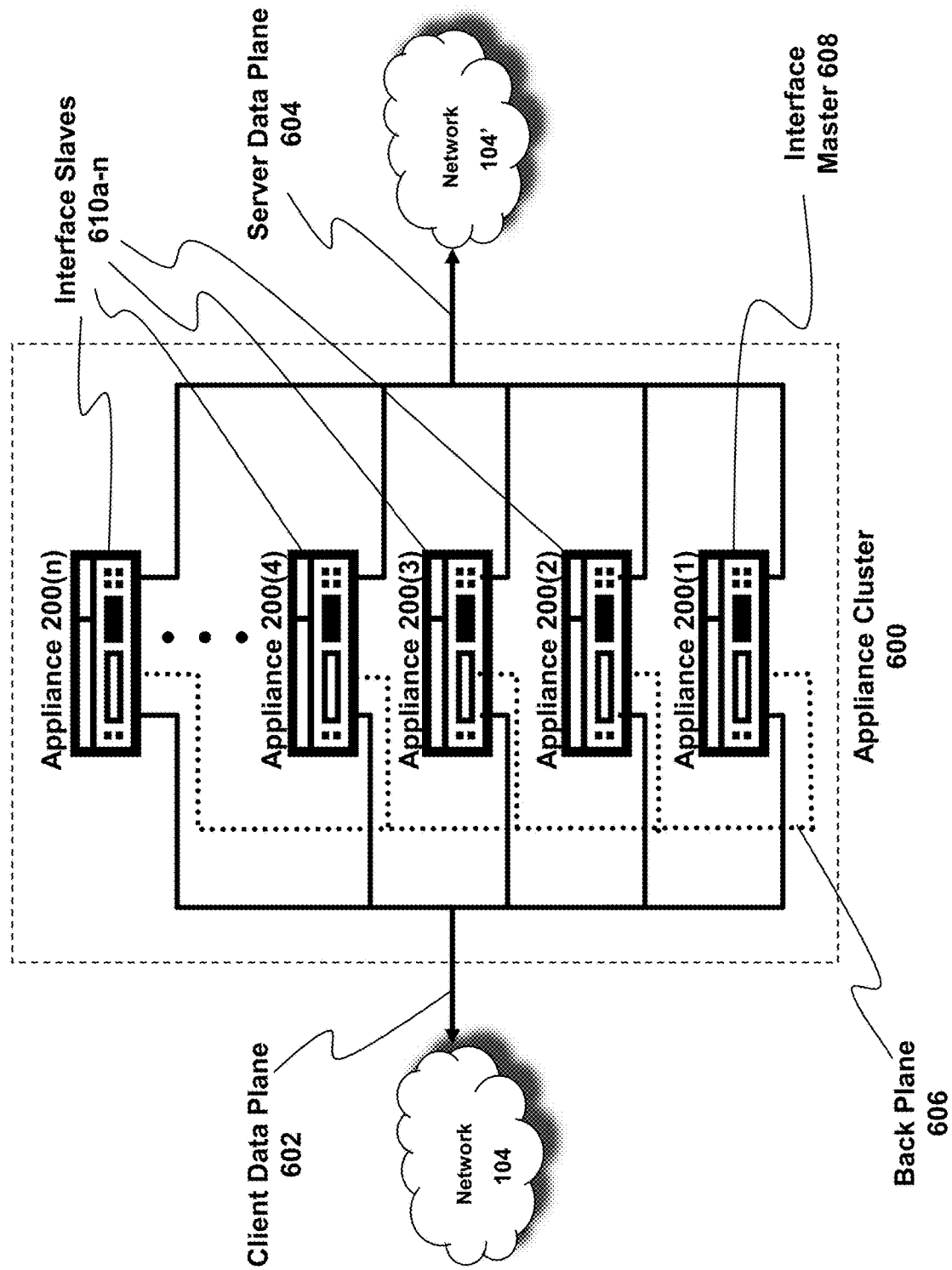
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

B. Remote Display Protocol Proxy with Single Sign-On and Enforcement Support

Systems and methods for remote desktop protocol (RDP) proxy with single sign-on and enforcement support are provided herein. For example, an appliance can be disposed within a network environment between one or more clients and one or more servers (e.g., resource servers, RDP host servers, target servers). The appliance can generate authentication credentials that enable the client device to access one or more resource links configured to connect the client device to at least one of the one or more servers. In some embodiments, the client device can launch a connection to a resource link independent of the appliance using the authentication credentials. For example, the client device may authenticate to the appliance and the appliance can provide the client device a list of resource links (e.g., RDP resource links) that a user of the client device can access using authentication credentials.

The resource links can be generated such that when the client device interacts with the respective resource link, the request for a connection causes the appliance to provide the authentication credentials to the client device and/or store the authentication credentials on the client device. In some embodiments, the appliance can store the authentication credentials on the client device through use of a script, command line, and/or a downloadable file. The client device can launch the connection to a respective one of the resource links without a prompt for credentials. For example, the connection can be launched directly to the corresponding RDP host server of the connection can be launched through the appliance with or without enforcement support.

Figure 5A:
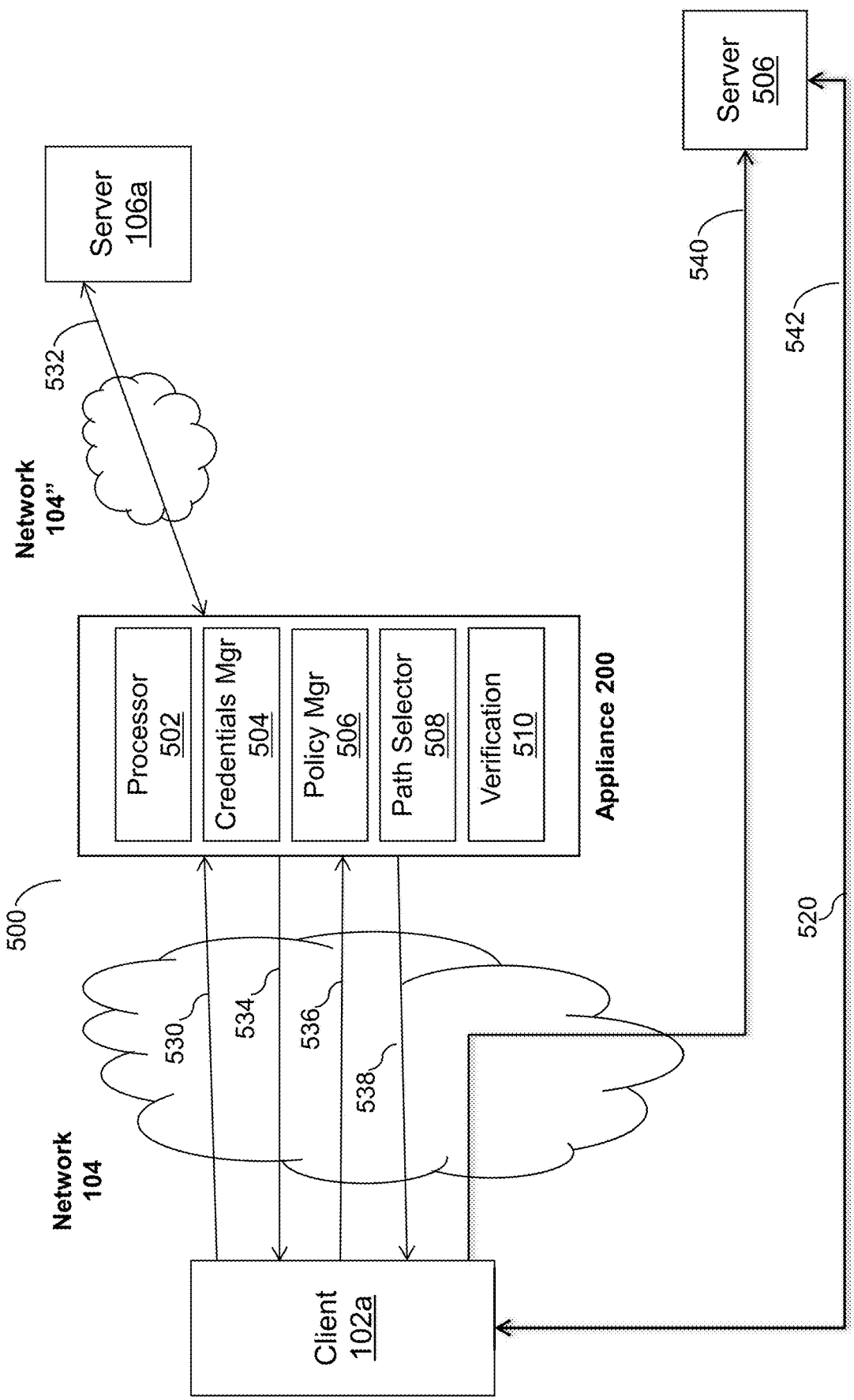
FIG. 5A is a block diagram of a system launching a connection to a resource link from a client device.
Figure 5B:
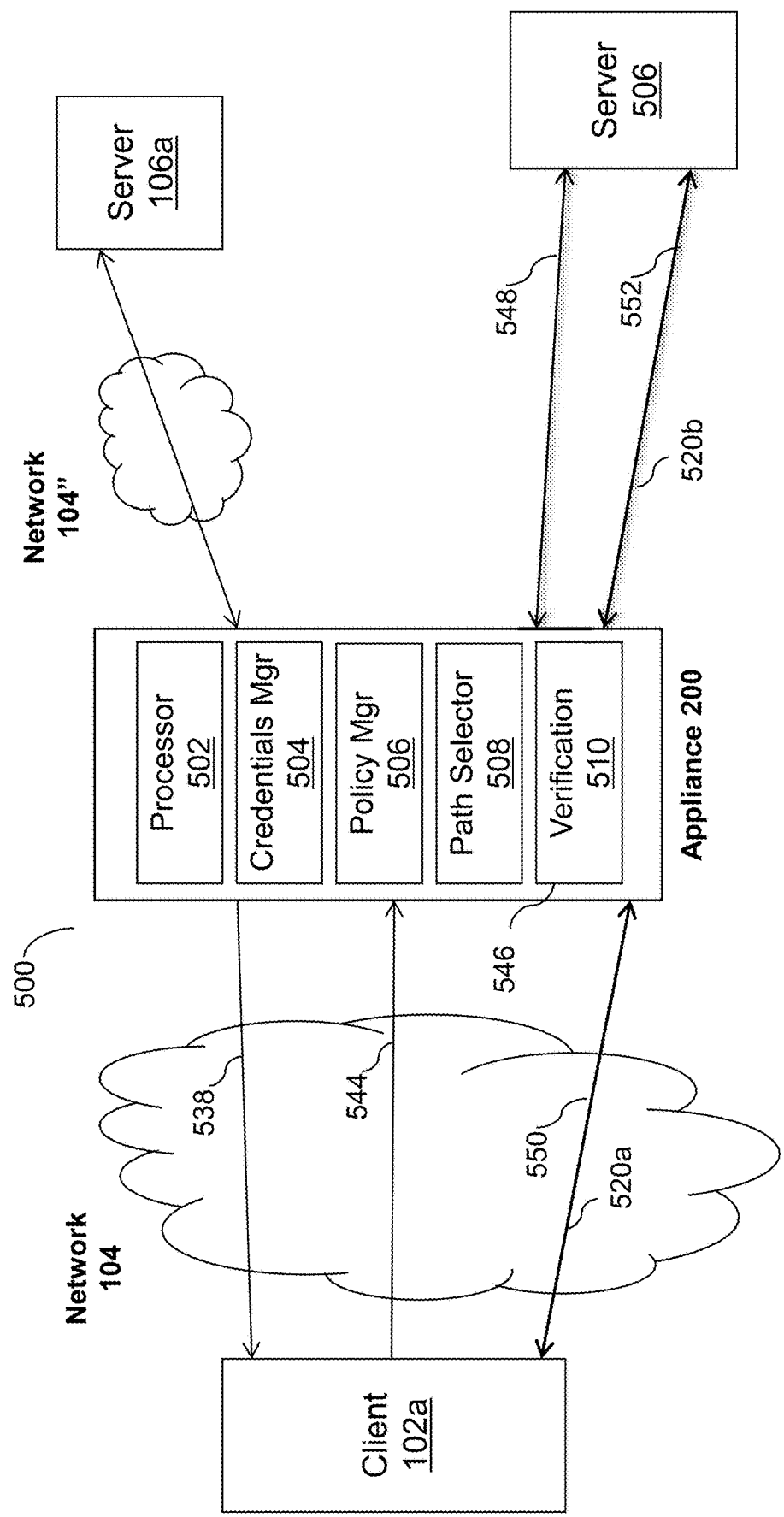
FIG. 5B is a first block diagram of a system launching a connection to a resource link from a client device using an appliance as a proxy.
Figure 5C:
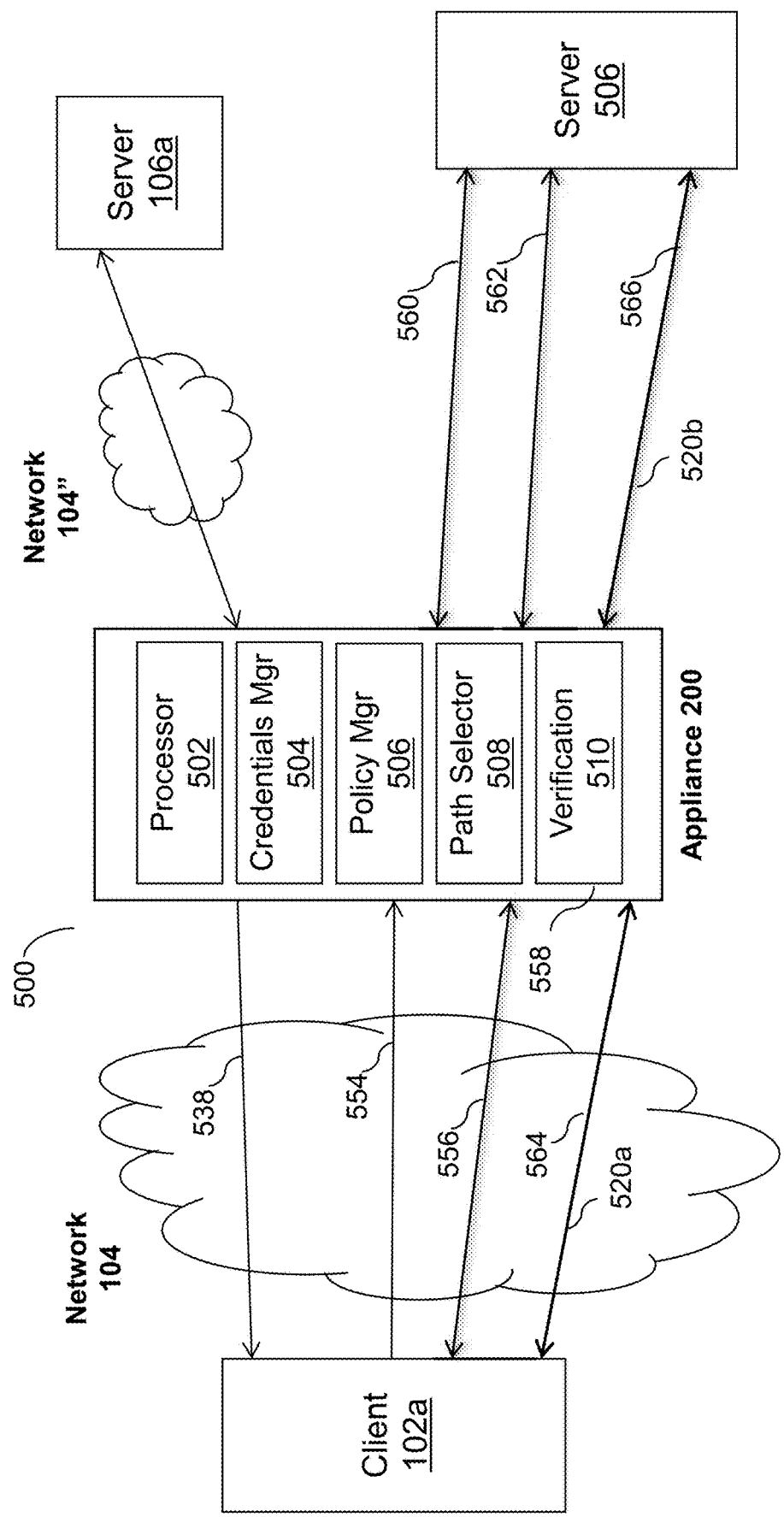
FIG. 5C is a second block diagram of a system launching a connection to a resource link from a client device using an appliance as a proxy.

Referring now to FIGS. 5A-5C, a network environment 500 is provided having an appliance 200 (also referred to herein as "device") in communication with at least one client device, here a first client device 102a, through a first network 104 and in communication with an authentication server 106a and a first resource server 506, through a second network 104". In some embodiments, the first resource server 506 can include multiple servers, such as but not limited to, remote desktop protocol (RDP) host devices or servers.

Any device, such as an intermediary device between clients and servers, for example and generally referred herein as the appliance 200, can be configured to provide remote desktop protocol proxy with single sign-on and enforcement support for one or more client devices 102 to access one or more resource servers 506. For example, the appliance 200 can authenticate a plurality of client devices 102 for access to a plurality of resource links 520. The resource links 520 can correspond to connections or pathways between the client devices 102 and at least one resource server 506. Responsive to the authentication, the appliance 200 can generate authentication credentials for the respective client devices 102, here the first client device 102. The appliance 200 can provide authentication credentials to the first client device 102a such that the first client device 102a can launch a connection to at least one of the resource links 520 without a prompt for credentials.

The appliance 200 can include a processor 502, a credentials manager 504, a policy manager 506, a path selector 508, and a verification manager 510. The processor 502 can include non-volatile memory that stores computer instructions and an operating system. For example, the computer instructions can be executed by the processor 502 out of volatile memory to perform all or part of the method 600.

The credentials manager 504 can include a database and be configured to generate and/or store authentication credentials for the first client 102a and the resource servers 506. In some embodiments, the credentials manager 504 can receive the authentication credentials from the authentication server 106a and store the authentication credentials responsive to receiving them. The policy manager 506 can be configured to provide enforcement support for connections between the first client device 102a and the appliance 200 and/or provide enforcement support for connections between the appliance 200 and the resource servers 506. For example, the policy manager 506 can be configured to apply policies to selectively allow or block parameters within connections between the first client device 102a and the appliance 200 and/or provide enforcement support for connections between the appliance 200 and the resource servers 506.

The path selector 508 can be configured to identify and select connections or paths to one or more of a plurality of resource servers 506. For example, the path selector 508 can select a connection to a particular resource server 506 based at least in part on load balancing data, bandwidth data, and/or authentication credentials of the respective resource server 506. The verification manager 510 can be configured to verify authentication credentials received from the first client device 102a and/or authentications credentials received from or corresponding to one or more of the plurality of resource servers 506. In some embodiments, the verification manager 510 can verify tokens or other forms of identifiers corresponding to one or more of the plurality of resource servers 506 to select a resource server 506 for connection to the first client device 102a.

The first client device 102a can be the same as or substantially similar to at least one of clients 102(1)-102n of FIG. 1A or client 102 of FIG. 1B. The authentication server 106a and the first resource server 506 can be the same as or substantially similar to servers 106(1)-106n of FIG. 1A and server 106 of FIG. 1B. For example, the authentication server 106a and the first resource server 506 may include an application delivery system for delivering a computing environment, application, and/or data files to first client device 102a.

The authentication server 106a can be configured to authenticate credentials for appliance 200. For example, authentication server 106a can be configured to authenticate first client device 102a for access to a plurality of resource links 520 that connect the first client device 102a to one or more resource servers 506. In some embodiments, the authentication server 106a can be configured to authenticate the first resource server 506 for a connection to the first client device 102a.

Authentication server 106a can include a memory to store a plurality of account profiles, account names, account passwords or other forms of credentials. The authentication server 106a can receive a request for first client device 102a to access at least one resource link 520 from appliance 200 and generate authentication credentials for the first client device 102a and/or generate authentication credentials for the first resource server 506. In some embodiments, the authenticated credentials can include a privilege level or access level indicating a level of access a corresponding client device 102 is permitted with respect to one or more of the resource servers 506 through the plurality of resource links 520.

Appliance 200 and/or authentication server 106a may use the collected information to determine and provide access, authentication and authorization control of the first client device's connection to a first resource link 520 through network 104.

Depicted in FIGS. 5A-5C is a plurality of communications (represented herein by "Blocks") between the first client device 102a, the appliance 200, the authentication server 106a, and/or the first resource server 506. The communications or blocks correspond to a method (e.g., method 600 of FIG. 6) for launching a connection to a resource link 520 from the first client device 102a.

For example, the appliance 200 can communicate with the first client device 102a, the authentication server 106a, and/or the first resource server 506 to authenticate the first client device 102a and provide authentication credentials to the client device 102a such that the first client device 102a can launch the connection to the first resource link 520 from the first client device 102a.

At block 530, the first client device 102a can authenticate to the appliance 200. The first client device 102a transmits an authentication request to the appliance 200. The authentication request can include user information, such as but not limited to, a username, a user profile, user credentials, user passwords, and/or client device data.

At block 532, the appliance 200 can use the authentication server 106a to authenticate the client device 102a. For example, the appliance 200 can transmit the user information received in the authentication request from the first client device 102a to the authentication server 106a. The authentication server 106a can be configured to make a determination, using the user information, which resource links 506 the first client device 102a is permitted access to and a level of access for the determined one or more resource links 506. The authentication server 106a can use a variety of different authentication protocols or techniques to authenticate the first client device (or the resource server 506), such as but not limited to, lightweight directory access protocol (LDAP) authentication, remote authentication dial-in user service (RADIUS) authentication, or security assertion markup language (SAML) authentication.

In some embodiments, the authentication server 106a can generate authentication credentials for the first client device 102a. In other embodiments, and the appliance 200 can generate the authentication credentials for the first client device 102a. The authentication credentials can include a level of access to at least one of the resource links 506. Authentication credentials can be generated for each resource link 520 the first client device 102a is permitted to access.

At block 534, the appliance 200 can provide a list of a plurality of resource links 520 to the first client device 102a, responsive to the authentication. The appliance 200 can generate a listing having each of the resource links 520 the first client device 102a is permitted to access. In some embodiments, the listing can be provided in the form of a webpage (e.g., homepage). For example, the resource links 520 can represented by a hyperlink (or more simply link), hypertext, icon or other form of reference to data corresponding to the resource links 520.

The resource links 520 can be displayed in a variety of different arrangements in a display provided to a user of the first client device 102a. For example, the resource links 520 can be arranged in ascending or descending order based on a level of access the first client device 102a is permitted with the respective resource link 520. Each of the resource links 520 can be displayed having the same or similar stylistics features. In some embodiments, one or more of the resource links 520 can be displayed having one or more different stylistic features such that the one or more resource links 520 are displayed more prominently than the remaining other resource links 520.

At block 536, the appliance 200 can receive a launch request from the first client device 102a. In some embodiments, the launch request can include a RDP launch request for access to one or more resource servers 506.

The launch request can be received responsive to a user interaction with one or more of the resource links 520 provided to the first client device 102a. For example, the first client device 102a can receive the list of the plurality of resource links 520 and a user of the first client device 120a can interact with one or more of the resource links 520. An interaction may include, but not limited to, clicking on a resource link 520, tapping on a resource link 520, hovering over a resource link 520, or other forms of actions taken with at least one of the resource links 520.

At block 538, the appliance 200 can store or otherwise provide the authentication credentials to the first client device 102a. For example, the appliance 200 can store the authentication credentials responsive to receiving an indication of a user interaction with one or more of the resource links 520 at the first client device 102a. The appliance 200 can store authentication credentials for each resource link 520 a user of the first client device 102a interacts with.

The authentication credentials can be stored on the first client device 102a using a variety of different techniques. For example, in some embodiments, the authentication credentials can be stored on the first client device using a script (e.g., server side script, client side script). The script can be provided to or downloaded to the first client device 102a from the appliance 200.

In some embodiments, the appliance 200 can provide the first client device 102a a command line command corresponding to the requested resource link 520. The first client device 102a can execute the command line command to launch a connection. The appliance 200 can provide or download a file (e.g., resource file, RDP file) having information corresponding to the requested resource link 520 and a script to the first client device 102a. A connection from the first client device 102a to one or more resource links 520 can be launched using the file and/or the script.

At block 540, the first client device 102a can use the authentication credentials to launch a connection to the first resource link 520. In some embodiments, the first client device 102a can launch the connection to the first resource link 520 through the downloaded file and/or the script. In other embodiments, the first client device 102a can launch the connection to the first resource link 520 using the executable command line command.

The first client device 102a can launch the connection to the first resource link 520 without a prompt for credentials. For example, once the appliance 200 has authenticated the first client device 120a, the first client device 102a can initiate a connection to access one or more of the resource links 520 without a prompt for additional credentials or an additional authentication stage. Therefore, the appliance 200 can provide single sign-on access for the first client device 102a to one or more of the resource links 520 using the authentication credentials.

At block 542, the first resource link 520 can connect the first client device 102a to the first resource server 506. A connection or stream between the first client device 102a and a first resource server 506 can be established using the first resource link 520. The first resource link 520 connection between the first client device 102a and the first resource server 506 can include an RDP stream established between the first client device 102a and the first resource server 506.

In some embodiments, the appliance 200 can proxy the connection between the first client device 102a and the first resource server 506. For example, and referring now to FIG. 5B, a diagram of a connection between the first client device 102a and the first resource server 506 being launched through the appliance 200 is provided.

The appliance 200 can be configured to launch an RDP connection between the first client device 102a and the first resource server 506. The connection from the first client device 102a to the first resource link 520 can be launched to the appliance 200, for example, instead of from the first client device 102a.

In the illustrative embodiment of FIG. 5B, the authentication credentials have been previously stored or provided to the first client device 102a at block 538.

At block 544, the appliance 200 can receive a launch request from the first client device 102a. The launch request (also referred to as a connection request) can include client device identifiers (e.g., ID tokens), resource server identifiers (e.g., ID tokens), load balance information, client device data, user profile, and data corresponding to one or more resource links 520, and data corresponding to one or more resource servers 506. For example, the launch request can include an identifier (e.g., token) corresponding to a resource server 506 the appliance 200 should proxy the connection. In some embodiments, the launch request can be provided in the form of a protocol data unit (PDU).

At block 546, the appliance 200 can verify an identifier (e.g., token) corresponding to the first client device 102a and/or a requested resource server 520 using the verification manager 510. The appliance 200 can compare the identifier to a listing of identifiers or certificates stored on the appliance 200 or stored on the authentication server 106a. For example, the appliance 200 can verify an identifier provided in the launch request by polling files stored on a memory of the appliance 200 or polling files stored on a memory of the authentication server 106a. If the identifiers correspond to an authenticated client device and/or an authenticated resource, the appliance 200 can use the identifier to determine the requested or appropriate resource server 506 of a plurality of resource servers 506. In some embodiments, the appliance 200 can authenticate the requested or appropriate resource server 506.

At block 548, the appliance 200 can establish a server connection to the first resource server 506. In some embodiments, the appliance 200 can proxy the connection to the first resource server 506 through the second network 104".

At block 550, the appliance 200 can establish a client connection to the first client device 102a using the first resource link 520a. The client connection can include an RDP stream established between the first client device 102a and the appliance 200.

At block 552, the appliance 200 can proxy a connection between the first client device 102a and the first resource server 506 using the first resource link 520b. The appliance 200 can proxy the connection between the first client device 102a and the first resource server 506 using the client connection and the server connection using a first portion of the first resource link 520a and a second portion of the resource link 520b. The first portion of the resource link 520a can correspond to an RDP connection or RDP stream between the first client device 102a and the appliance 200. The second portion of the resource link 520b can correspond to an RDP connection or RDP stream between the appliance 200 and the first resource server 506.

The appliance 200 can operate as in intermediary between the first client device 102a and the first resource server 506. In some embodiments, the appliance 200 can connect or combine the client connection and the server connection. For example, the appliance 200 can connect or combine the first portion of the first resource link 520a and the second portion of the first resource link 520b to establish an RDP connection or RDP stream between the first client device 102a and the first resource server 506.

In some embodiment, the appliance 200 can use credentials managed by the authentication server 106a of stored on the appliance 200 to identify and connect the first client device 102a to the first resource server 506. For example, and now referring to FIG. 5C, the authentication credentials have been previously stored or provided to the first client device 102a at block 538.

At block 554, the appliance 200 can receive a launch request from the first client device 102a. The launch request (also referred to as a connection request) can include client device identifiers (e.g., ID tokens), resource server identifiers (e.g., ID tokens), load balance information, client device data, user profile, and data corresponding to one or more resource links 520, and data corresponding to one or more resource servers 506.

At block 556, the appliance 200 can establish a client connection to the first client device 102a. In some embodiments, the client connection can be a secure connection and/or an encrypted connection between the appliance 200 and the first client device 102a. For example, in one embodiment, the client connection can be established using Credential Security Support Provider protocol (CredSSP).

At block 558, the appliance 200 can determine a first resource server 506 from a plurality of resource servers 506 to proxy a connection to for the first client device 102a using the verification manager 510. The appliance 200 can identify the first resource server 506 using a field corresponding to a connection to the plurality of resource servers 506. For example, the appliance 200 can identify the first resource server 506 using a username field within a server connection (e.g., CredSSp stream, RDP stream) to the plurality of resource servers 506. Thus, in some embodiments, the appliance 200 may not use an identifier (e.g., username) and/or the authentication credentials stored on the first client device 102a to identify the first resource server 506.

At block 560, the appliance 200 can establish a server connection to the first resource server 506. The appliance 200 can authenticate the first resource server 506 to establish the server connection. For example, the appliance 200 may use the authentication credentials to authenticate the first resource server 506. In some embodiments, the appliance 200 can retrieve server credentials from the authentication server 106a and compare the server credentials to credentials received from the first resource server 506. Responsive to the comparison, the appliance 200 can authenticate the first resource server 506 for a connection with the first client device 102a.

At block 562, the appliance 200 can establish a secure connection and/or encrypted connection to the first resource server 506. For example, the appliance 200 can encrypt or otherwise secure the server connection to the first resource server 506 using CredSSP protocol, responsive to authenticating the first resource server 506.

In some embodiments, the appliance 200 can provide enforcement support for connections between the first client device 102a and the first resource server 506. For example, the appliance 200 can apply one or more polices to the client connection established at blocks 554-556 between the first client device 102a and the appliance 200. The appliance 200 can apply one or more policies to the server connection between established at block 562 between the appliance 200 and the first resource server 506. The appliance 200 can use the policies to control access provided to the first client device 102a for the first resource server 506. For example, the appliance 200 to allow or block one or more parameters within the client connection and/or the server connection to control the level of access the first client device 102a is given to the first resource server 506.

At block 564, the appliance 200 can establish the client connection using the first portion of the first resource link 520a. The first portion of the resource link 520a can correspond to an RDP connection or RDP stream between the first client device 102a and the appliance 200. The second portion of the resource link 520b can correspond to an RDP connection or RDP stream between the appliance 200 and the first resource server 506.

At block 566, the appliance 200 can proxy a connection between the first client device 102a and the first resource server 506 using the first portion of the first resource link 520a and the second portion of the first resource link 520b. The second portion of the resource link 520b can correspond to an RDP connection or RDP stream between the appliance 200 and the first resource server 506. The appliance 200 can operate as in intermediary between the first client device 102a and the first resource server 506 using the first and second portions 520a, 520b of the first resource link 520.

As illustrated in FIGS. 5A-5C, the appliance 200 can be configured to provide remote desktop protocol proxy with single sign-on and enforcement support for the first client device 102a to access the first resource server 506 using the first resource link 520. Responsive to the authentication of the first client device 102a, the appliance 200 can generate and provide authentication credentials to the first client device 102a such that the first client device 102a can launch a connection to the resource link 520 without a prompt for credentials.

Figure 6:
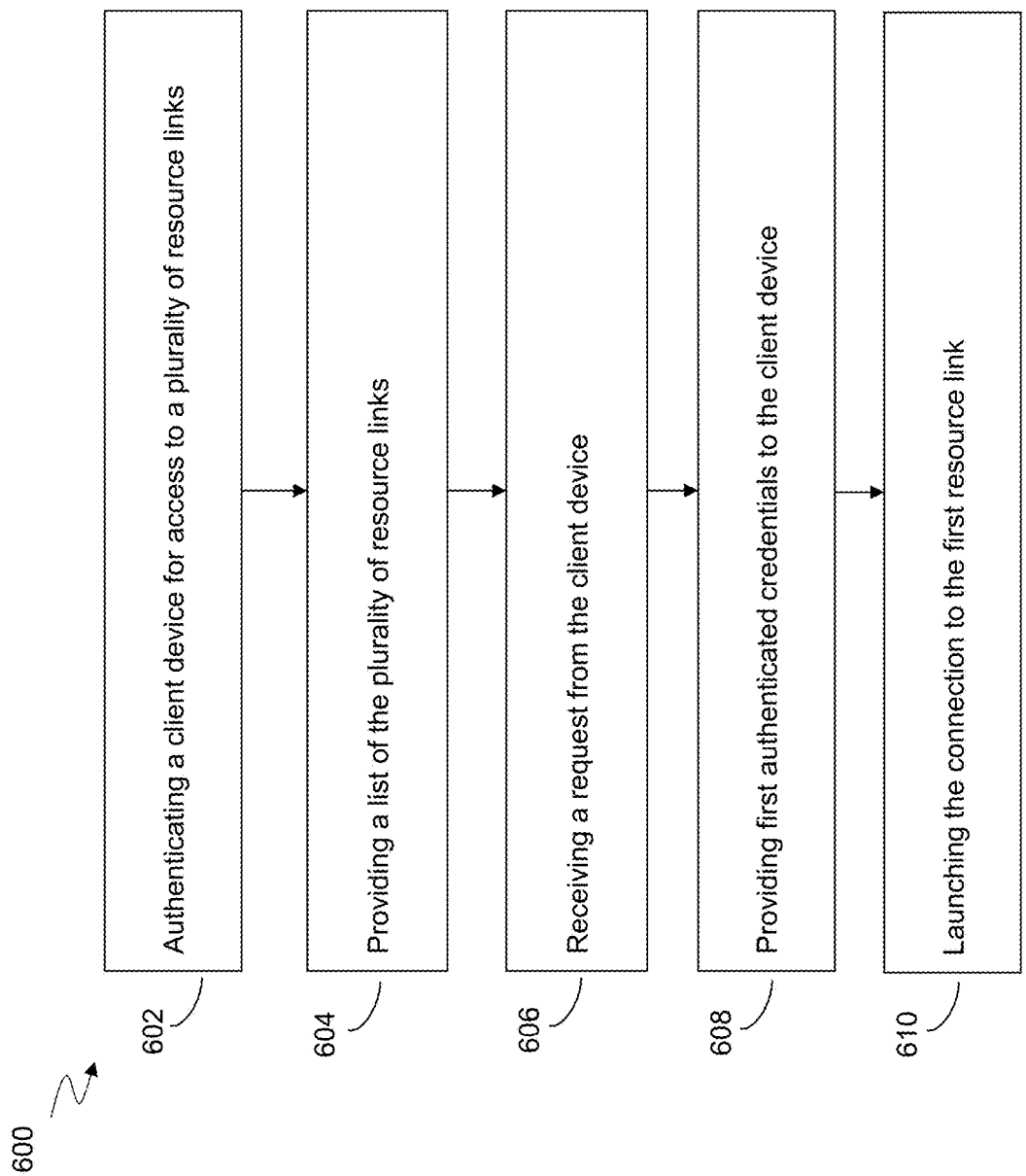
FIG. 6 is a flow diagram of a method for launching a connection to a resource link from a client device.

Referring now to FIG. 6, a method 600 for launching a connection to a resource link from a client device is provided. A device intermediary to the client device and one or more servers (e.g., resource servers, authentication servers) can be configured to generate authentication credentials for the client device such that the client device can launch a connection to one or more resource links of a plurality of resource links using the authentication credentials. For example, the client device may launch the connection directly from the client device and thus, independent of the device. In some embodiments, the client device can launch the connection to one or more resource links without a prompt for credentials. The device can be the same as or substantially similar to the appliance 200 of FIGS. 1A-1B, 2, and 4-5C.

The method 600 begins at block 602, by authenticating a client device for access to a plurality of resource links. The resource links accessible via one or more servers. The device intermediary to the client device and the one or more servers can authenticate the client device using an authentication server. For example, and as described above with respect to block 530 of FIG. 5A, the device can receive an authentication request from the client device. The authentication request can include client device information such as, but not limited to, a username, a user profile, user credentials, user passwords, client device credentials and/or client device data.

The device can be communicatively coupled with an authentication server and the device can transmit the client device information from the authentication request to the authentication server (see block 532 of FIG. 5A). In some embodiments, the authentication server can execute on the device.

The authentication server can authenticate the client device using the client device information. The authentication server can generate authentication credentials for the client device and transmit the authentication credentials to the device. In some embodiments, the device can generate the authentication credentials responsive to receiving an indication from the authentication server that the client device can be permitted access to one or more resource links. The authentication credentials can be generated for each resource link the client device is permitted to access. The authentication credentials can include the respective resource link the client device is permitted to access and a level of access permitted for the corresponding resource link.

At block 604, the device can provide a list of the plurality of resource links to the client device. For example, the device can provide the list of the plurality of resource links to the client device responsive to the authentication of the client device (see block 534 of FIG. 5A). The list of resource links can be provided in a variety of different forms to the client device. The device may generate a webpage, such as a homepage, having the list of resource links the client device has been authenticated for. The resource links can be represented by hyperlinks, hypertexts, or icons on the web page.

In some embodiments, the resource links can arranged based in part on a level of access the client device is permitted to the respective resource link. For example, the resource links can be arranged in descending order with resource links the client device was given a higher or greater level of access listed before resource links the client device was given a lower level of access to. In other embodiments, the resource links can be arranged in ascending order with resource links the client device was given a lower level of access listed before resource links the client device was given a higher or greater level of access to.

The plurality of resource links can include one or more remote desktop protocol (RDP) connections. For example, the resource links can correspond to connections to one or more RDP host devices or RDP host servers. In some embodiments, the resource links can correspond to RDP streams coupling the client device with the device, one or more resource servers, RDP host devices and/or RDP servers.

At block 606, the device can receive a request from the client device. The request can include or identify a first resource link from the plurality of resource links (see block 536 of FIG. 5A). In some embodiments, the request can include a launch request to launch a connection the first resource link.

The request can be initiated at the client device responsive to an interaction with at least one of the resource links provided in the list of the plurality or resource links. An interaction can include an action taken with at least one of the resource links or icons corresponding to at least one of the resource links, such as but not limited to, clicking on a resource link, tapping on a resource link, or hovering a resource link for a predetermined period of time. The request can be transmitted to the device including an identifier indicating the selected resource link.

At block 608, the device can provide first authentication credentials to the client device. For example, and as described above with respect to block 538 of FIG. 5A, the device can cause first authentication credentials to be stored or provided to the client device responsive to the request. The first authentication credentials can correspond to the client device to access the first resource link.

The device can transmit, provide or store the authentication credentials on the client device. For example, the device can cause the authentication credentials to be stored on the client device using a script provided to the client device. In some embodiments, the authentication credentials can be provided to the client device through a command line command. The device can transmit or download a resource file (e.g., rdp file) to the client device. The client device can use the resource file to launch a connection to the corresponding resource link. In some embodiments, the device can provide or download the resource link having the script to the client device and client device can use the resource file to launch a connection to the corresponding resource link.

The device can store authentication credentials for each resource link the client device interacts with or otherwise requests access to. For example, the device can cause a plurality of authenticated credentials to be stored on the client device. The client device can be configured to launch connections to the plurality of resource links using the plurality of authentication credentials provided by the device and stored on the client device.

At block 610, the connection to the first resource link can be launched. The client device can be configured to launch the connection to the first resource link from the client device using the first authenticated credentials stored on the client device. The connection to the first resource link can be launched from the client device using the first authentication credentials to connect to one of the device or a first resource server of the one or more servers. For example, and as described above with respect to blocks 540-542 of FIG. 5A, the client device can connect to the device or the one or more resource servers of the one or more servers using the first resource link. Thus, the client device can use the authentication credentials to connect to the device or one or more resource servers of the one or more servers without a prompt for credentials.

The connection to the first resource link can be launched from the client device via one of a command line or a file using the first authentication credentials stored on the client device and without a prompt for credentials. The client device can use the command line or the resource file to retrieve the authentication credentials, such as from the device, and launch the connection to the first resource link. Thus, the client device can launch the connection to the first resource link directly from the respective client device and independent of the device. For example, the client device can launch the connection to the first resource link without a prompt for additional credentials or other types of activity by a user of the client device.

In some embodiments, the device can proxy a connection between the client device and the first resource link and/or a resource server using the first resource link. For example, and as described above with respect to block 544 of FIG. 5B and block 554 of FIG. 5C, the device can receive a launch request from the client device for connection to the first resource link. The launch request can include the first authenticated credentials stored on the client device. The device can use the first authentication credentials to verify the client device.

In some embodiments, the launch request can include an identifier for one or more servers, also referred to herein as resource servers, the client device requests to connect to using the first resource link. The launch request may include a protocol data unit having load balancing information corresponding to network traffic between the device and one or more client devices and/or between the device and one or more servers, such as but not limited to, an authentication server and/or a resource server (e.g., RDP host servers). The device can use the load balancing info to determine the resource server the device should proxy a connection to using the first resource link. For example, the device can identify the requested first resource server from the one or more servers using data from the launch request.

A second connection can be established by the device between the device and the first resource server using second authentication credentials managed by the device to authenticate to the first resource server on behalf of the client device. For example, and as described above with respect to block 550 of FIG. 5B and block 556 of FIG. 5C, the device can establish a client connection (e.g., first connection) between the client device and the device. The device can establish the client connection using the first authentication credentials.

The device can establish a server connection (e.g., server connection) between the device and a first resource server of the one or more servers (see block 548 of FIG. 5B and block 560 of FIG. 5C). The server connection can be established to the first resource server providing the first resource link. In some embodiments, the server connection can be established by the device using second authentication credentials or credentials that are different from the credentials stored on the client device. For example, the device, responsive to the first authentication credentials, can authenticate one of the client device or a user of the client device to one or more of the servers hosting the plurality of resource links using authentication credentials (e.g., second authentication credentials) managed by the device for accessing by one of the client device or the user of the client device the one or more servers. The second authentication credentials can be different from the first authentication credentials.

The second authentication credentials can be managed the device to authenticate to the first resource server on behalf of the client device. For example, the second authentication credentials can be stored on an authentication server communicatively coupled with the device or stored in a memory or database of the device. The second authentication credentials can include credentials corresponding to the respective resource server, a digital certificate, or an identifier corresponding to the respective resource server. In some embodiments, the second authentication credentials can be generated previously and stored on the authentication server communicatively coupled with the device or stored in a memory or database of the device.

The device can be configured to provide enforcement support for connections between the client device and the device and/or connections between the device and the one or more servers to control access to the one or more servers from the client device. For example, and as described above with respect to block 562 of FIG. 5C, the device can apply one or more polices to the client connection between the client device and the device and/or apply policies to the server connection between the device and the first resource server.

The policies can be used to control access to the first resource link. The policies can be used to control a level of access to a resource server, manage bandwidth between the client device and the one or more servers, and/or selectively permit the client device to access the resource server using the first resource link. For example, the device can use the polices to block (e.g., selectively block) one or more parameters within the client connection and/or the server connection (e.g., within the RDP stream between the client device and the device and/or within the RDP stream between the device and the first resource server). The parameters can include, but not limited to, RDP parameters selected based at least in part on a configuration of the device and/or the networks 104, 104" coupling the client device, device, authentication server, and the one or more servers.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for launching a connection to a resource link from a client device, the method comprising:
   authenticating, by a device intermediary to a client device and one or more servers, the client device for access to a plurality of resource links accessible via the one or more servers, the plurality of resource links include one or more remote desktop protocol (RDP) connections;
   providing, by the device to the client device, a list of the plurality of resource links responsive to the authentication;
   receiving, by the device, a request from the client device, identifying a first resource link from the plurality of resource links and information indicating at least one server of the one or more servers to establish an RDP connection; and
   causing, by the device, first authenticated credentials for the first resource link to be stored on the client device via a script downloaded to the client device from the device and responsive to the request, the first authenticated credentials corresponding to the client device to access the first resource link through the RDP connection via the at least one server of the one or more servers, and wherein the client device is configured to launch a connection to the first resource link from the client device using the first authenticated credentials stored on the client device.

2. The method of claim 1, further comprising causing, by the device, a plurality of authenticated credentials to be stored on the client device, the client device configured to launch connections to the plurality of resource links using the plurality of authentication credentials provided by the device and stored on the client device.

3. The method of claim 1, wherein the plurality of resource links include the one or more remote desktop protocol (RDP) connections to the one or more servers.

4. The method of claim 1, further comprising the connection to the first resource link being launched from the client device via one of a command line or a file using the first authentication credentials stored on the client device and without a prompt for credentials.

5. The method of claim 1, further comprising:
   receiving, by the device, a launch request from the client device for connecting to the first resource link, the launch request including the first authenticated credentials stored on the client device.

6. The method of claim 5, further comprising:
   verifying, by the device, the first authentication credentials from the client device;
   identifying, by the device, for the first resource link, a first resource server of the one or more servers from the launch request; and
   establishing, by the device, a second connection between the device and the first resource server using second authentication credentials managed by the device to authenticate to the first resource server on behalf of the client device.

7. The method of claim 1, further comprising:
causing, by the device, the authentication credentials for each of the plurality of resource links to be stored on the client device via scripts provided by the device.

8. The method of claim 1, wherein the connection to the first resource link is launched from the client device using the first authentication credentials to connect to one of the device or a first resource server of the one or more servers.

9. The method of claim 1, further comprising authenticating, by the device responsive to the first authentication credentials, one of the client device or a user of the client device to one or more of the servers hosting the plurality of resource links using authentication credentials managed by the device for accessing by one of the client device or the user of the client device the one or more servers, the authentication credentials different from the first authentication credentials.

10. The method of claim 1, comprising:
establishing, by the device, the connection between the client device and the device using the first authentication credentials and a second connection between the device and the first resource server of the one or more servers providing the first resource link using second authentication credentials managed by the device to authenticate to the first resource server on behalf of the client device; and
applying, by the device, one or more policies to one of the connection or the second connection to control access to the first resource link.

11. A system for launching a connection to a resource link from a client device, the system comprising:
a device intermediary to a client device and a server, the device configured to:
authenticate the client device for access to a plurality of resource links accessible via the one or more servers, the plurality of resource links include one or more remote desktop protocol (RDP) connections;
provide to the client device a list of the plurality of resource links responsive to the authentication;
receive a request from the client device identifying a first resource link from the plurality of resource links and information indicating at least one server of the one or more servers to establish an RDP connection; and
cause first authenticated credentials for the first resource link to be stored on the client device via a script downloaded to the client device from the device and responsive to the request, the first authenticated credentials corresponding to the client device to access the first resource link through the RDP connection via the at least one server of the one or more servers, and wherein the client device is configured to launch a connection to the first resource link from the client device using the first authenticated credentials stored on the client device.

12. The system of claim 11, wherein the device is further configured to cause a plurality of authenticated credentials to be stored on the client device, the client device configured to launch connections to the plurality of resource links using the plurality of authentication credentials provided by the device and stored on the client device.

13. The system of claim 11, wherein the plurality of resource links include the one or more remote desktop protocol (RDP) connections to the one or more servers.

14. The system of claim 11, wherein the connection to the first resource link is launched from the client device via one of a command line or a file using the first authentication credentials stored on the client device and without a prompt for credentials.

15. The system of claim 11, wherein the device is further configured to receive a launch request from the client device for connecting to the first resource link, the launch request including the first authenticated credentials stored on the client device.

16. The system of claim 15, wherein the device is further configured to:
verify the first authentication credentials from the client device;
identify a first resource server of the one or more servers for the first resource link from the launch request; and
establish a second connection between the device and the first resource server using second authentication credentials managed by the device to authenticate to the first resource server on behalf of the client device.

17. The system of claim 11, wherein the device is further configured to cause the authentication credentials for each of the plurality of resource links to be stored on the client device via scripts provided by the device.

18. The system of claim 11, wherein the connection to the first resource link is launched from the client device using the first authentication credentials to connect to one of the device or a first resource server of the one or more servers.

19. The system of claim 11, wherein the device is further configured to authenticate, responsive to the first authentication credentials, one of the client device or a user of the client device to one or more of the servers hosting the plurality of resource links using authentication credentials managed by the device for accessing by one of the client device or the user of the client device the one or more servers, wherein the authentication credentials are different from the first authentication credentials.

20. The system of claim 11, wherein the device is further configured to:
establish the connection between the client device and the device using the first authentication credentials and a second connection between the device and a first resource server of the one or more servers providing the first resource link using second authentication credentials managed by the device to authenticate to the first resource server on behalf of the client device; and
applying, by the device, one or more policies to one of the connection or the second connection to control access to the first resource link.

* * * * *